United States Patent [19]

Ishida et al.

[11] Patent Number: 4,694,607
[45] Date of Patent: Sep. 22, 1987

[54] APPARATUS FOR DETECTING DOOR MOVEMENT DATA IN AN AUTOMATIC DOOR SYSTEM

[75] Inventors: Takao Ishida, Kurobe; Yukio Yoshida, Namerikawa; Kenzo Ohno, Toyama, all of Japan

[73] Assignee: Yoshida Kogyo K.K., Tokyo, Japan

[21] Appl. No.: 877,540

[22] Filed: Jun. 23, 1986

[30] Foreign Application Priority Data

Jun. 24, 1985 [JP] Japan .................................. 60-135933

[51] Int. Cl.⁴ .............................................. E05F 15/20
[52] U.S. Cl. ...................................................... 49/25
[58] Field of Search ...................... 49/25, 26, 28, 360, 49/31

[56] References Cited

U.S. PATENT DOCUMENTS

| 4,009,476 | 2/1977 | Lutz | 49/25 X |
| 4,029,176 | 6/1977 | Mills | 49/25 X |
| 4,296,570 | 10/1981 | Balbach et al. | 49/360 |
| 4,330,960 | 5/1982 | Hasemann et al. | 49/360 X |
| 4,452,014 | 6/1984 | Markus | 49/360 |

Primary Examiner—Philip C. Kannan
Attorney, Agent, or Firm—Hill, Van Santen, Steadman & Simpson

[57] ABSTRACT

An apparatus for detecting door movement data in an automatic door system is improved in that an opening-direction sensor and a closing-direction sensor are provided on a horizontal member of a slide door frame, while a slide door is provided with a dog having a plurality of actuating portions adapted to switch ON or OFF the opening-direction sensor and the closing-direction sensor as arrayed at an interval in the direction of sliding, so that the opening direction sensor and the closing direction sensor may be switched ON and OFF repeatedly as the door is moved in the opening or closing direction.

9 Claims, 16 Drawing Figures

APPARATUS FOR DETECTING DOOR MOVEMENT DATA IN AN AUTOMATIC DOOR SYSTEM

BACKGROUND OF THE INVENTION

1. Field of the Invention

The present invention relates to an apparatus for detecting door movement data, which are necessary for automatically controlling opening and closing operations of a door in an automatic door system, such as, for example, a deceleration start position where a door begins to be operated for opening or closing at a low speed, a stop position where the door is stopped, and a moving speed of the door, etc.

2. Description of the Prior Art

There has heretofore been known an automatic door system in which sensors such as pairs of a magnet and a lead switch are disposed on a door and a door frame, respectively, so that a deceleration start position and a stop position may be detected by means of these sensors.

However, such type of known automatic door systems failed to detect a moving speed of a door, especially a moving speed within a deceleration region, and collision of the door against a human body within the deceleration region.

SUMMARY OF THE INVENTION

It is therefore one object of the present invention to provide an improved apparatus for detecting door movement data in an automatic door system which is free from the shortcoming in the prior art.

According to one feature of the present invention, there is provided an apparatus for detecting door movement data in an automatic system, comprising a door frame in which a slide door is provided so as to be moved freely in the opening and closing directions, an opening-direction sensor and a closing direction sensor disposed on a horizontal member of the door frame, a dog having a predetermined horizontal member of the door frame, a dog having a predetermined horizontal length and disposed on the door, said dog including a plurality of actuating portions adapted to turn ON or OFF the opening-direction and closing-direction sensors and disposed on the dog at a predetermined space interval in the longitudinal direction thereof.

According to the present invention, owing to the above-featured construction of the apparatus for detecting door movement data in an automatic door system, when the slide door is moved in the opening direction or in the closing direction, the opening-direction sensor or the closing-direction sensor, respectively, can be turned ON and OFF repeatedly by the plurality of actuating portions of a dog, and so, electric signals generated by the turning ON and OFF of the opening-direction sensor or the closing-direction sensor, respectively, enables door movement data such as a deceleration start position, a stop position, and a door moving speed, etc., to be detected.

The above-mentioned and other objects, features and advantages of the present invention will become more apparent by reference to the following description of preferred embodiments of the invention taken in conjunction with the accompanying drawings.

BRIEF DESCRIPTION OF THE INVENTION

In the accompanying drawings.

DESCRIPTION OF THE PREFERRED EMBODIMENTS

Figure 2:
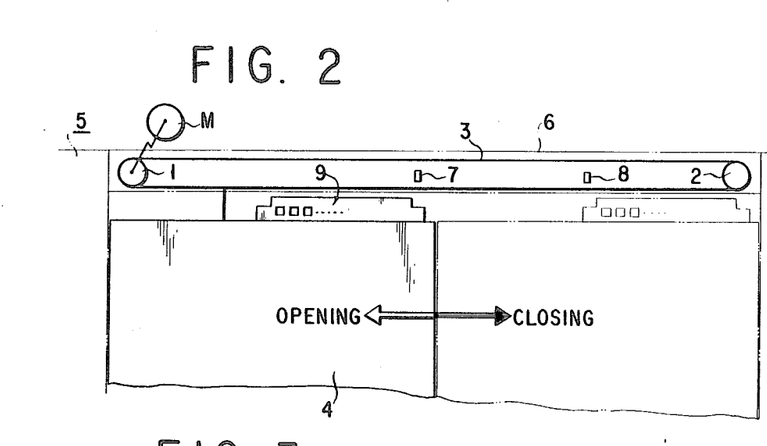
FIG. 2 is a schematic front view of an automatic door system according to one preferred embodiment of the present invention.

An automatic door system according to one preferred embodiment of the present invention is shown in FIG. 2 in a schematic front view, in which a belt 3 is wound around a driving pulley 1 which is rotated in a normal or reverse direction by a motor M and a driven pulley 2, a door 4 is connected to this belt 3, so that the door 4 can be moved by the motor M in the opening and closing directions within a door frame 5. The above-mentioned driving pulley 1, driven pulley 2 and belt 3 are disposed on a transom forming the door frame 5 or on a horizontal member 6 of an engine case or the like mounted to the transom, and also on the respective sides in the opening direction and in the closing direction of this horizontal member 6 are provided an opening-direction sensor 7 and a closing direction sensor 8, and on the top edge of the door 4 is provided a dog 9.

Figure 1:
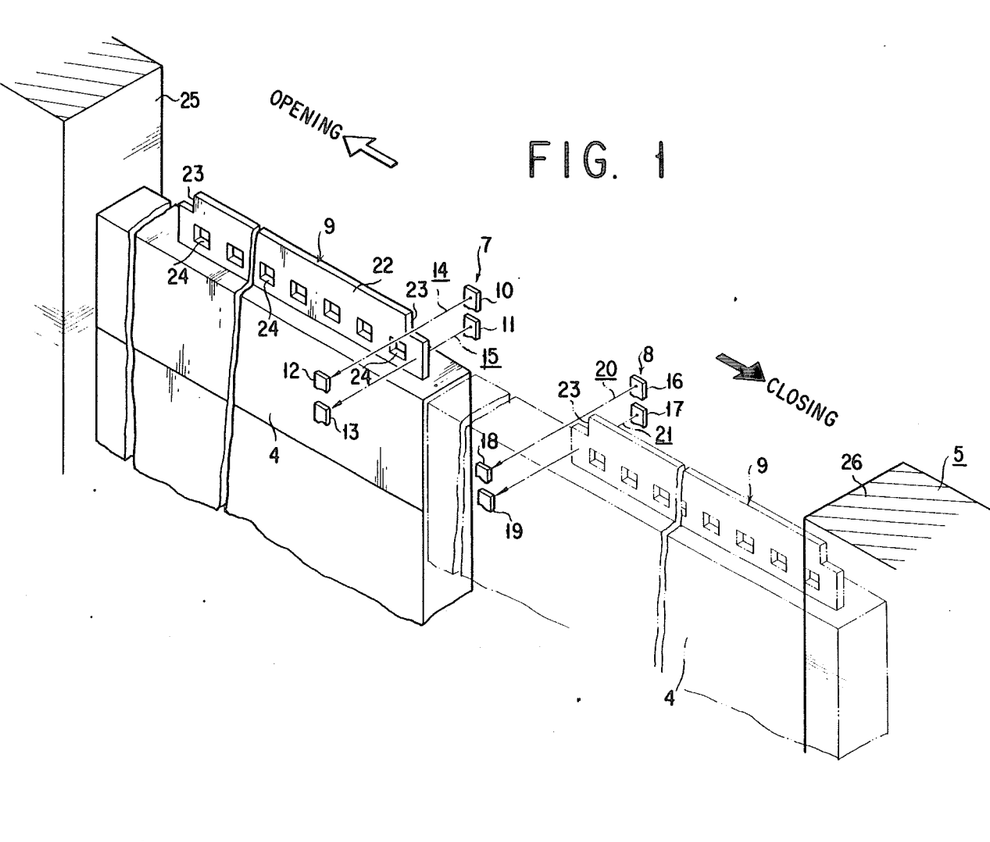
FIG. 1 is a perspective view showing a mounted state of a dog and opening-direction and closing-direction sensors.

As shown in FIG. 1, the opening-direction sensor 7 comprises first and second photo-electric switches 14 and 15 consisting, respectively, of a first light source 10 and a first photo-transistor 12 and of a second light source 11 and a second photo-transistor 13. In like manner, the closing-direction sensor 8 comprises third and fourth photo-electric switches 20 and 21 consisting, respectively, of a third light source 16 and a third photo-transistor 18 and of a fourth light source 17 and a fourth photo-transistor 19.

In the embodiment shown in FIG. 1, the first and second light sources 10 and 11 are mounted on a horizontal member 6 on one side of the door 4, in a vertically spaced apart relationship with each other, whilst the first and second photo-transistors 12 and 13 are likewise mounted, on another horizontal member 6 on the opposite side of the door 4, in a vertically spaced apart relationship with each other and opposite to the first and second light sources 10 and 11. Whilst, the third and fourth light sources 16 and 17 are mounted on the horizontal member 6 on one side of the door 4, at a position spaced apart by a predetermined distance from the first and second light sources 10 and 11, respectively, in the sliding direction thereof, and in a vertically spaced apart relationship with each other. Whilst, the third and fourth photo-transistors 18 and 19 are mounted on the another horizontal member 6 on the opposite side of the door 4, in a vertically spaced apart relationship with each other and in an opposed relationship to the third and fourth light sources 16 and 17, respectively. The dog 9 consists of an elongated plate-shaped main body 22 with notches 23, 23 formed at the top portions of the respective sides of the main body 22 and a plurality of holes 24 formed in its lower portion at an equal space interval in the longitudinal direction thereof. The holes 24, 24 at the opposite extreme ends are located in the obliquely inward and downward direction of corresponding notches 23, 23. The outer side surface of each of the holes or apertures 24, 24 is located in alignment with the side surface of each of the corresponding notches 23, 23. The dog 9 is secured to the top edge of the door 4 in such a manner that the notches 23, 23 are disposed horizontally opposite to the first and third photo-electric switches 14 and 20, respectively, and the holes 24 at the extreme ends are disposed horizontally opposite to the second and fourth photoelectric switches 15 and 21, respectively. Furthermore, with respect to the horizontal direction, the respective photoelectric switches 14, 15, 20 and 21 are positioned so that when the door 4 moves in the opening direction and one side end of the door 4 has struck against a vertical frame 25 on one side of the door frame 5 and has come to an end of an opening stroke, the first photo-electric switch 14 of the opening-direction sensor 7 may be positioned at the notch 23 on the other side of the dog 9 so as to be turned ON, but the second photo-electric switch 15 of the same sensor may be shielded by the dog main body 22 so as to be turned OFF, and that when the door 4 moves in the closing direction and the other side end of the door 4 has struck against a vertical frame 26 on the other side of the door frame 5 has come to an end of a closing stroke, the third photo-electric switch 20 of the closing-direction sensor 8 may be positioned at the notch 23 on the one side of the dog 9 so to be turned ON, but the fourth photo-electric switch 21 of the same sensor may be shielded by the dog main body 22 so as to be turned OFF.

The length of the main body 22 of the dog 9 is chosen nearly equal to the distance of movement at the reduced speed of the door 4.

Since the apparatus for detecting door movement data is constructed as described above, when the door 4 moves in the opening direction or in the closing direction, the second photo-electric switch 15 or the fourth photo-electric switch 21 is shielded by the main body 22 of the dog 9 so as to be turned OFF earlier than the first photo-electric switch 14 or the third photo-electric switch 20, and thereafter as the door 4 continues to move in the opening direction or in the closing direction, the first photo-electric switch 14 or the third photo-electric switch 20 is also shielded by the main body 22 of the dog 9 so as to be turned OFF and keeps its OFF state. When the door 4 moves further the second photo-electric switch 15 or the fourth photo-electric switch 21 is repeatedly turned ON and OFF, and when the door 4 has reached a position close to an opening or closing stroke end (i.e., the distance away from the opening or closing stroke end is distance corresponding to the length of the dog 9), one of pairs of photo-electric switches keep their ON states because of being free from the dog 9, while one of another pair of photo-electric switches which corresponds to the notch 23 on either side of the dog 9 is OFF slightly later than the other photo-electric switch which will be repeatedly turned ON and OFF in a short time by the action of the holes 24 of the dog 9. And, when the door 4 has reached the opening or closing stroke end, the first photo-electric switch 14 or the third photo-electric switch 20 is turned ON earlier, and the second photo-electric switch 15 or the fourth photo-electric switch 21 is subsequently turned OFF.

Now description will be made on one example of the operations of detecting data on various kinds of door movements by means of the above-described dog 9, opening-direction sensor 7 and closing-direction sensor 8.

Figure 3:
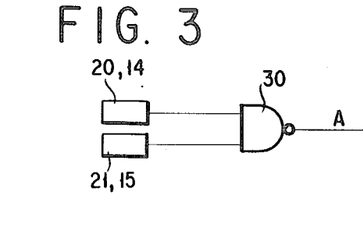
FIG. 3 is a circuit diagram of a deceleration start position detection circuit.

In first place, in order to detect the deceleration start position and the decelerating region during the opening-direction movement or the closing-direction movement of the door 4, it is only necessary to connect the first photo-electric switch 14 or the third photo-electric switch 20 or the second photo-electric switch 15 or the fourth photo-electric switch 21, respectively, to the input of a NAND gate 30 as shown in FIG. 3, and detect the deceleration start position and the deceleration region according to an output signal A from the NAND gate 30.

Figure 4:
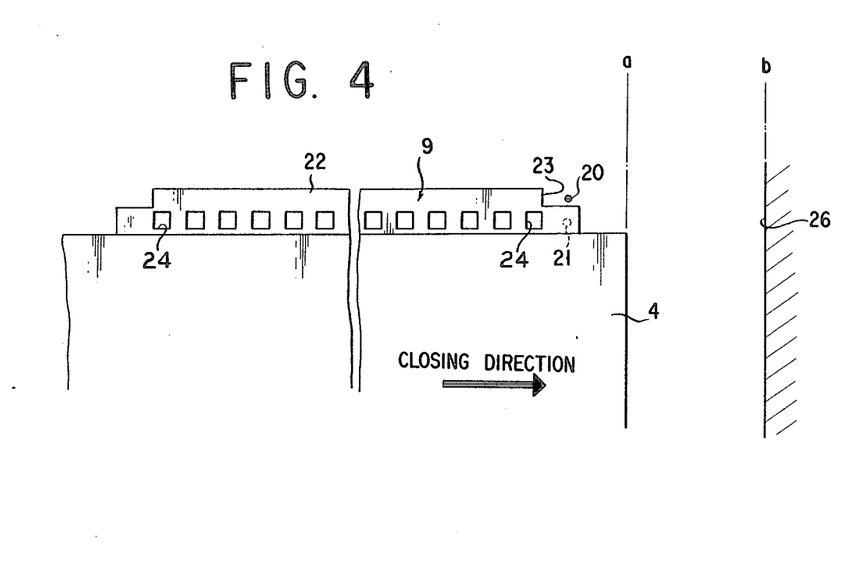
FIG. 4 is a front view of a slide door at a deceleration start position.
Figure 5:
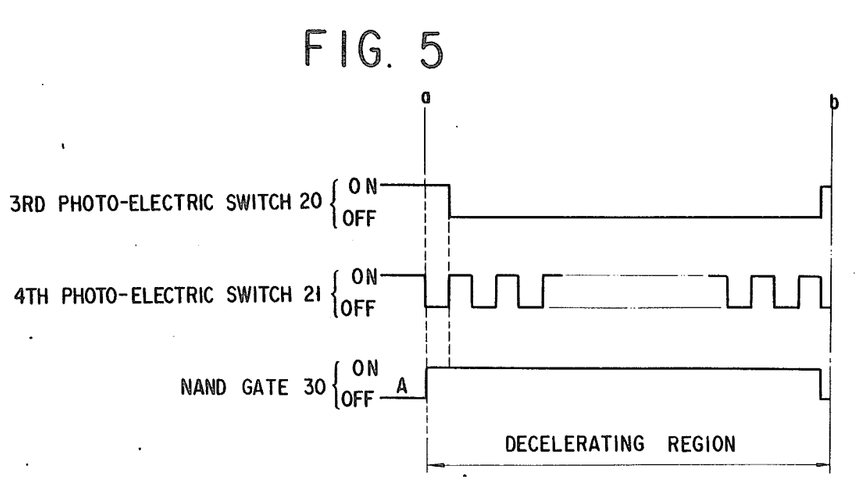
FIG. 5 is an operation timing chart of the circuit in FIG. 3.

More particularly, as shown in FIG. 4, when the door 4 moves in the closing direction and it has reached a deceleration start position a that is preset in accordance with the weight of the door 4, the fourth photo-electric switch 21 is shielded by the main body 22 of the dog 9 so as to be turned OFF, while the third photo-electric switch is located so that it may be aligned with the notch 23 of the dog 9 thus keeping ON state as shown in FIG. 5, hence the NAND gate 30 will produce a signal A as an output. If the door 4 continues to move further, then the third photo-electric switch 20 is shielded by the main body 22 of the dog 9 so as to be turned OFF and is further kept OFF, while the fourth photo-electric switch 21 is repeatedly turned ON and OFF by the hole 24 so that the NAND gate 30 may continue to output the signal A. When the door 4 strikes against a vertical frame 26 on the other side and has come to the closing stroke end position b, the third photo-electric switch 20 is located so as to align with the notch 23 on the other side of the dog 9 so as to be turned ON, but the fourth photo-electric switch 21 is shielded by the main body 22 of the dog 9 so as to be turned OFF, and therefore, the output signal A of the NAND gate 30 will disappear.

Since the detecting apparatus operates in the above-mentioned manner, the deceleration start position a can be detected by the fact that the output signal A has been generated, and when this output signal A is being generated, it can be detected that the door 4 is positioned in the decelerating region.

Accordingly, the door 4 can be moved at a reduced speed by transmitting a deceleration command signal to the motor M in response to the signal A transmitted by the NAND gate 30, and collision of the door 4 against a human body in the deceleration region can be detected by detecting the fact that the door 4 is stopped when the NAND gate 30 continues to output the signal A.

Figure 6:
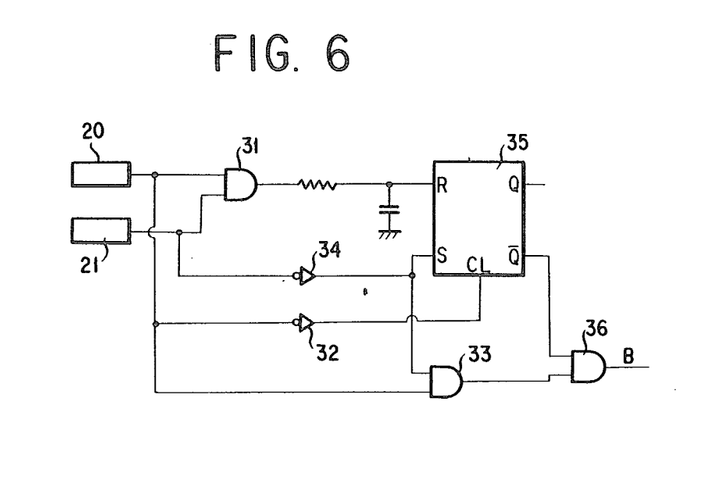
FIG. 6 is a circuit diagram of a stop position detector circuit.

In order to detect the stop position, it is only necessary, as shown in FIG. 6, to connect the output of the third photo-electric switch 20 to a first AND gate 31, a first NOT gate 32 and a second AND gate 33, to connect the output of the fourth photo-electric switch 21 to the first AND gate 31 and a second NOT gate 34, and to connect the output of the first AND gate 31 to an R-terminal of a flip-flop 35, the outputs of the first and second NOT gates 32 and 34 to a CL-terminal and an S-terminal, respectively, of the flip-flop 35, the output of the second NOT gate 34 to the second AND gate 33, the output of the second AND gate 33 and a $\overline{Q}$-output terminal of the flip-flop 35, respectively, to inputs of a third AND gate 36, and to detect the stop position according to generate an output signal B from the third AND gate 36.

Figure 7:
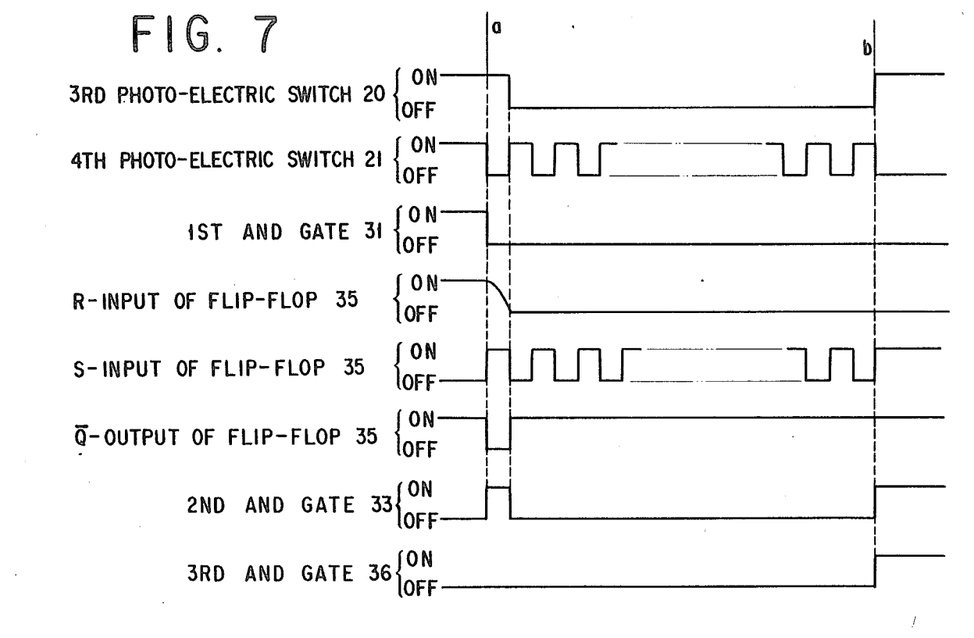
FIG. 7 is an operation timing chart of the circuit in FIG. 6.

Stating more specifically, when the dog 9 is kept away from the third and fourth photo-electric switches 20 and 21, both the latter are turned ON as shown in FIG. 7, and since a signal is input to the R-terminal of the flip-flop 35 and a signal is not input to the S-terminal and the CL-terminal of the flip-flop 35, no signal is generated by the $\overline{Q}$-output terminal while the $\overline{Q}$-output terminal generates an output signal. However, since the second AND gate 33 does not generate an output signal, the third AND gate 36 does not generate an output signal.

Meanwhile, when the door 4 has reached the deceleration start position a, the third photo-electric switch 20 is kept ON and the fourth photo-electric switch 21 is turned OFF as described previously, hence no signal is input to the R-terminal of the flip-flop 35 but a signal is input to the S-terminal, so that the $\overline{Q}$-output terminals does not generate and output signal, and therefore, even if the second AND gate 33 generates an outputs signal, the third AND gate 36 does not generated the output signal B.

As the door 4 moves further in the closing direction, the third photo-electric switch 20 is turned OFF and the fourth photo-electric switch 21 is turned ON, so that no signal is input to the R-terminal and the S-terminal of the flip-flop 35, but a signal is input to the CL-terminal, and hence an output signal is generated by the $\overline{Q}$-output terminal. However, since the second AND gate 33 does not generate and output signal, the third AND gate 36 does not generate the output signal B.

Figure 8:
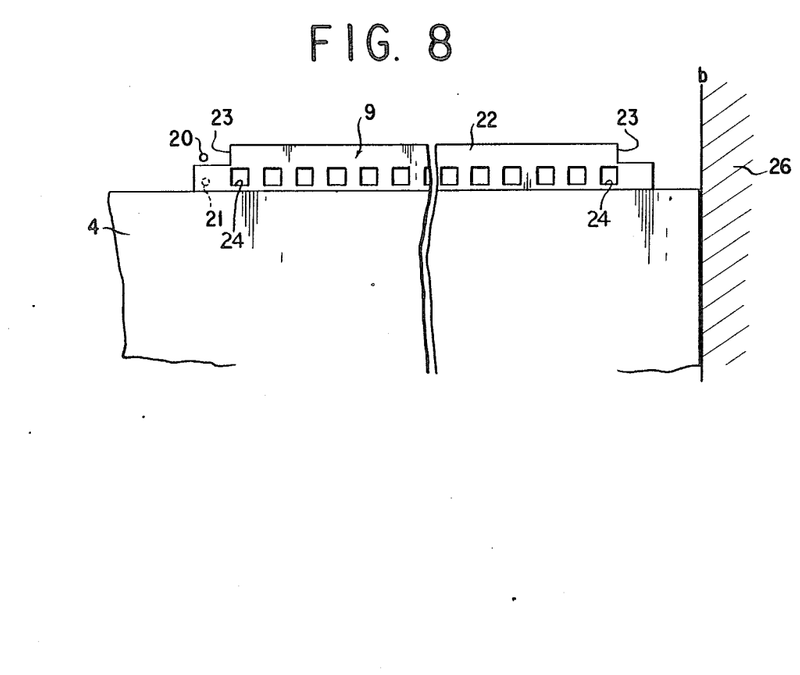
FIG. 8 is a front view of a slide door at a stop position.

Thereafter, while the fourth photo-electric switch 21 is repeatedly turned ON and OFF, a signal is continuously input to the CL-terminal, hence an output signal is continuously generated from the $\overline{Q}$-output terminal, and as shown in FIG. 8, when the door 4 has reached the stop position b, the third photo-electric switch 20 is turned ON, the fourth photo-electric switch 21 is turned OFF so that the second AND gate 33 generates an outputs signal, and the third AND gate 36 will generate the output signal B.

As the detecting apparatus operates in the above-described manner, in response to the output signal B from the third AND gate 36, it can be detected that the door 4 has reached the stop position, and thereby the door 4 can be stopped by transmitting a stop command signal to the motor M.

Figure 9:
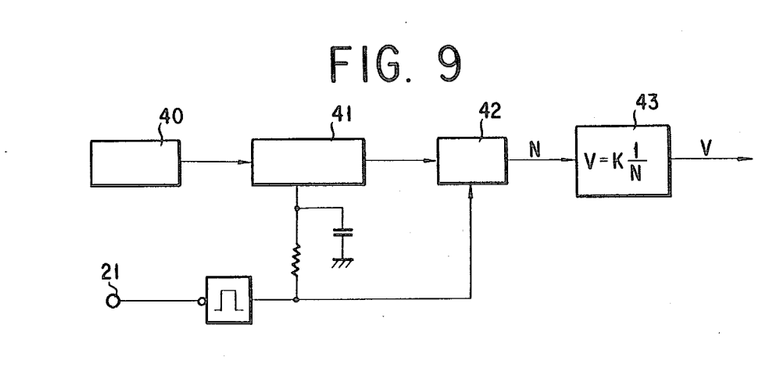
FIG. 9 is a circuit diagram of a speed detector circuit.
Figure 10:
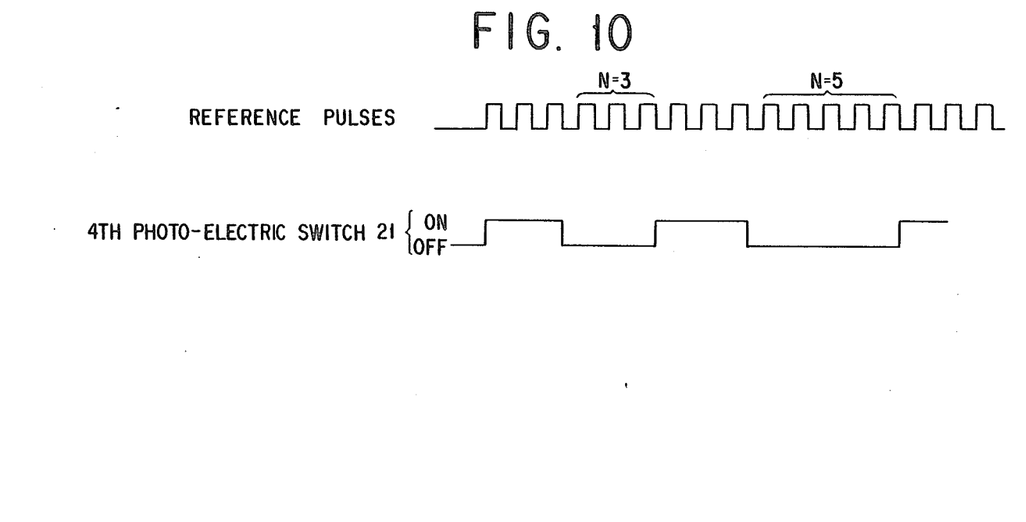
FIG. 10 is an operation timing chart of the circuit in FIG. 9.

In addition, in the case where it is desired to detect the moving speed of the door 4 within the decelerating region, as shown in FIG. 9, the output signal of the fourth photoelectric switch 21 is input to a counter 41 adapted to count reference pulses generated by a reference pulse generator 40, and then to a latch circuit 42 so that the counter 41 is reset by an ON signal generated by the fourth photo-electric switch 21, a number N of the reference pulses generated during the period when an OFF signal is output from the fourth photo-electric switch 21 is counted and latched in the latch circuit 42 as shown in FIG. 10, and the latched number N is sent to an arithmetic unit 43 to thereby detect a velocity V of the door 4.

Here, the velocity V is calculated by a formula $V = K1/N$, wherein K is a constant.

In other words, if the velocity is fast, the OFF time of the fourth photo-electric switch 21 is short, while if it is slow, the OFF time becomes long, and therefore, the velocity of the door 4 can be detected by counting the number of reference pulses generated during the OFF time of the fourth photo-electric switch 21.

While the above description has been made with respect to the case where the door 4 is moving in the closing direction, the same principle is also applied to the case where the door 4 is moving in the opening direction. In such a case, it is only necessary to determine whether the door 4 is moving in the closing direction or in the opening direction by detecting the direction of rotation of the motor M with a corresponding detector. However, in a modified embodiment of the present invention illustrated in FIGS. 11A and 11B, whether the door 4 is moving in the opening direction or in the closing direction can be discriminated by displacing the second photo-electric switch 15 of the opening-direction sensor 7 and the fourth photo-electric switch 21 of the closing direction sensor 8 by a distance less than the lateral width of the notch 23 with respect to the first and third photo-electric switches 14 and 20, respectively.

Figure 11A:
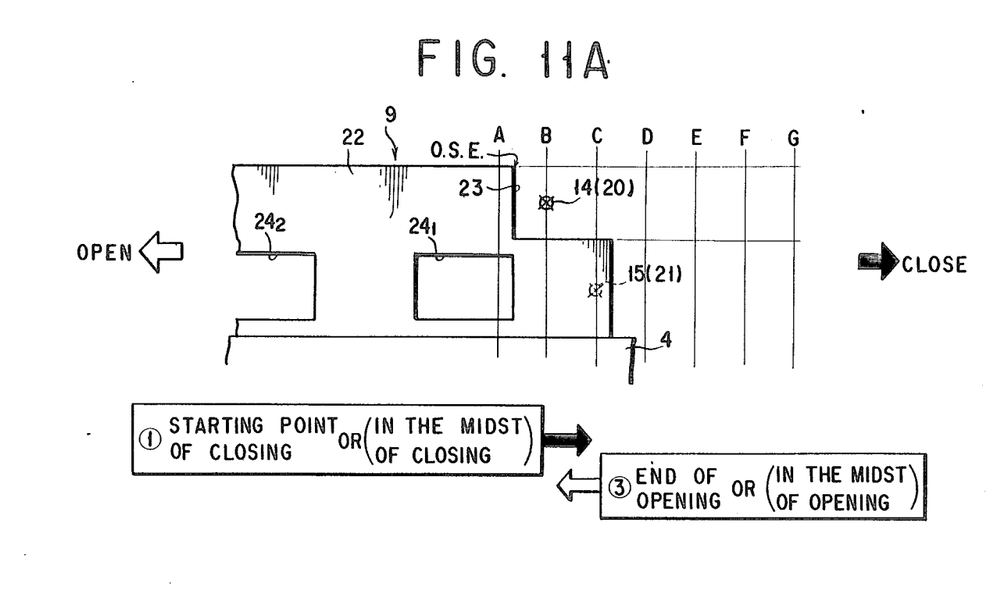
FIGS. 11A and 11B are schematic front views of an automatic door system according to another preferred embodiment of the present invention.
Figure 12A:
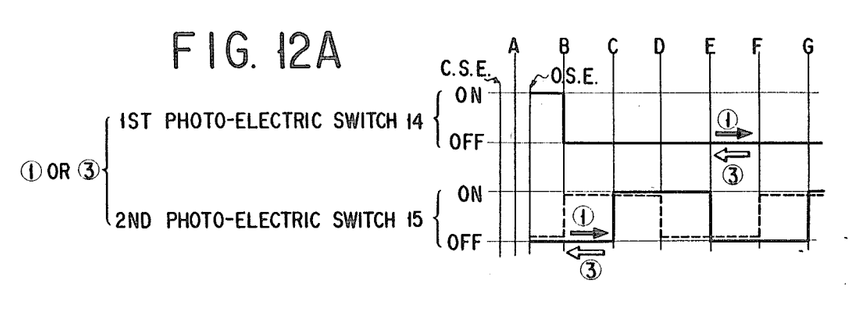
FIGS. 12A and 12B are explanatory views of operations of the embodiment shown in FIGS. 11A and 11B.

Stating in brief, in the first place, in FIG. 11A, in case the door 4 starts, for example, its closing movement from the opening stroke end, ON-OFF timing of the first and second photo-electric switches 14 and 15 to be determined by the position of the dog 9 is set such that, as shown in FIG. 12, the first photo-electric switch 14, which has been kept ON by the notch 23 at a point A, is turned OFF at a point B, and is thereafter kept in OFF state by the dog main body 22. Whilst, the second photo-electric switch, which has been kept OFF by the dog main body 22, is turned ON by the hole $24_1$ formed at the extreme end of the dog 9 at a point C, and is thereafter repeatedly turned ON and OFF with a cycle depending on the width of each the holes and the width of each of the portions formed between the holes. Further, FIG. 12A shows ON-OFF timing of the third and fourth photo-electric switches 20 and 21 when the door 4 is in the course of closing movement. Further, in case the door 4 is near its full open position or in the course of opening movement, ON-OFF timing of the first photo-electric switch 14 or the third photo-electric switch 20 is reversed from a point G towards the point A in FIG. 12A.

Figure 11B:
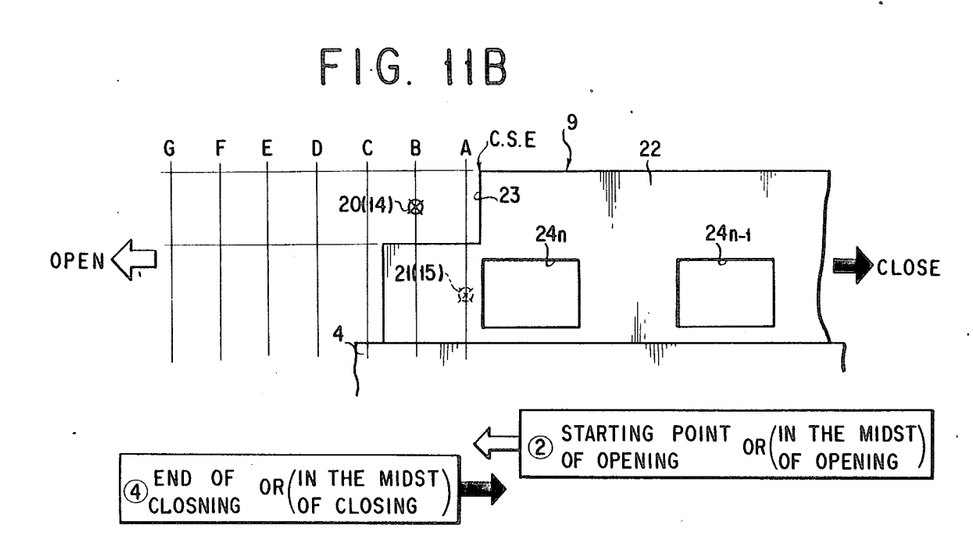
Figure 12B:
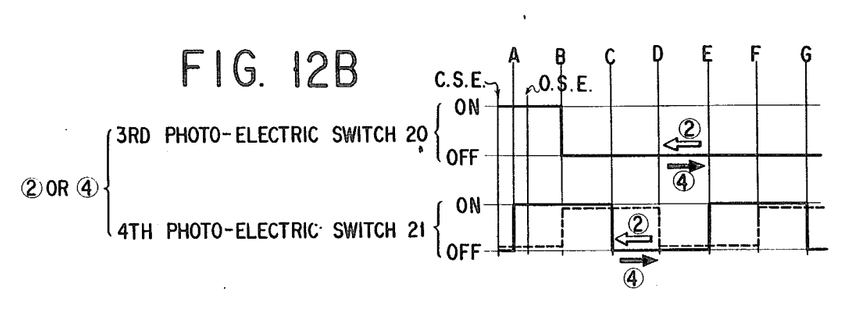

In the next place, in FIG. 11B, in case where the door 4 commences, for example, its opening movement from the closing stroke end, ON-OFF timing of the third and fourth photo-electric switches 20 and 21 is set in such a manner that, as shown in FIG. 12B, the fourth photo-electric switch 21 turned ON by the hole $24_n$ formed at another extreme end at the point A, and is thereafter repeatedly turned ON and OFF with a cycle depending on the width of each of the holes and the width of each of the portions between the holes. Whilst, the third photo-electric switch 20, which has been kept ON by another notch 23, is turned OFF at the point B, and is thereafter kept in OFF state by the dog main body 22. Further, FIG. 12B shows ON-OFF timing of the first and second photo-electric switches 14 and 15 when the door 4 is in the course of opening movement. Whilst, when the door 4 is near its fully closed position or in the course of closing movement, ON-OFF timing of the second photo-electric switch 15 or the fourth photo-electric switch 21 is reversed from the point G towards the point A in FIG. 12B. It is to be understood that ON-OFF timing of the second and fourth photo-electric switches 15 and 21 shown in FIG. 12A is obviously out of phase or deviated from that of the same shown in FIG. 12B. This deviation in timing enables whether the door 4 is moving in opening direction or in closing direction to be discriminated.

Dotted lines in FIGS. 12A and 12B illustrate ON-OFF timing of the second and fourth photo-electric switches 15 and 21 obtained by an apparatus which is different from the embodiment shown in FIG. 1 in that the positions of the second and fourth photo-electric switches 15 and 21 are not displaced from those of first and third photo-electric switches 14 and 20. In this case, there is no deviation in ON-OFF timing of the second and fourth photo-electric switches 15 and 21.

Further, as can be seen from FIGS. 11A, 11B, 12A and 12B, it is needless to say that in order to ensure that the second photo-electric switch 15 or the fourth photo-electric switch 21 is rendered OFF, the opening stroke end (OSE) of the door 4 is set at a position somewhat before the point A, whilst its closing stroke end (CSE) is set at a position somewhat further from the point A.

Figure 13:
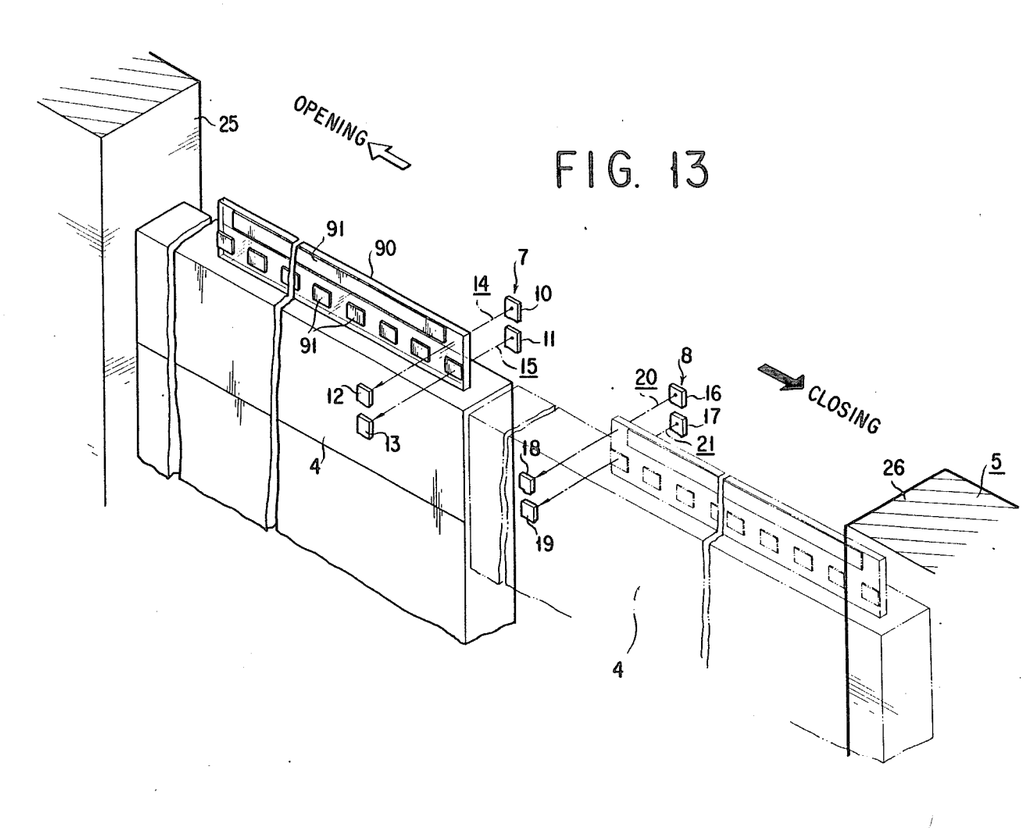
FIG. 13 is a perspective view of a further embodiment of the present invention.
Figure 14:
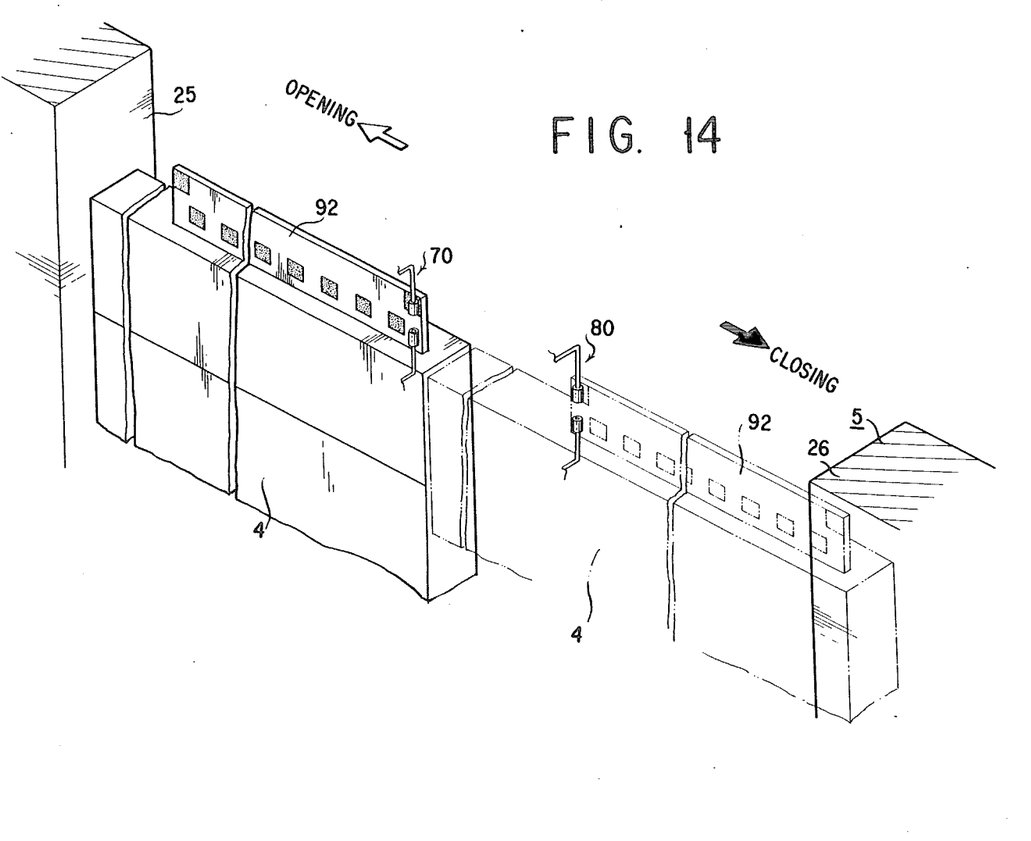
FIG. 14 is a perspective view of a still further embodiment of the present invention.

While, in the above-mentioned embodiment, the dog 9 comprises a main body formed with notches 23 and holes 24, it could be formed by applying reflective or opaque tapes 91 onto a main body 22 comprised of a transparent plate 90 as shown in FIG. 13, or the main body 22 of the dog 9 could be formed with sawtooth-like notches, and further, as shown in FIG. 14, the dog 9 may be formed by a plate of magnetic material 92 having a plurality of magnetized portions, while the opening direction sensor 7 and the closing direction sensor 8 may be make of a pair of magnetic field sensor switches 70 and 80, respectively. In other words, it is only required for the dog 9 to have a plurality of actuating portions for turning ON or OFF the sensor arranged at a predetermined space interval in the longitudinal direction thereof.

Since many changes and modifications can be made to the above-described construction without departing from the spirit of thepresent invention, it is intended that all matters given in the above description and illustrated in the accompanying drawings shall be interpreted to be illustrative only and not as a limitation to the scope of the invention.

What is claimed is:

1. An apparatus for detecting door movement data in an automatic door system, comprising a door frame in which a slide door is provided so as to be freely moved in the opening and closing directions, an opening-direction sensor and a closing-direction sensor mounted on a horizontal member of said door frame, a dog having a predetermined horizontal length and mounted on said door, said dog having a plurality of actuating portions adapted to turn ON or OFF said opening-direction and closing-direction sensors and disposed on said dog at a predetermined space interval in the longitudinal direction thereof.

2. The apparatus as claimed in claim 1, wherein said dog comprises a plate of magnetic material having a plurality of magnetized portions or tapes applied to proper places on one side of said door, whilst said opening direction sensor and said closing sensor each comprise a pair of magnetic field sensor switches.

3. The apparatus as claimed in claim 1, wherein the horizontal overall length of said dog is approximately equal to the distance of movement of said door at a reduced speed.

4. The apparatus as claimed in claim 1, wherein the opening and closing directions of said door can be discriminated by detecting the rotational direction of an electric motor which serves to slidably move said door.

5. The apparatus as claimed in claim 1, wherein said opening direction sensor comprises first and second photo-electric switches consisting of first and second light sources, respectively, mounted on a horizontal member one side of said door, in an up-and-down spaced apart relationship with each other and in opposed relationship to one of the actuating portions formed on said dog, and first and second photo-transistors, respectively mounted on another horizontal member on the opposite side of said door, in an up-and-down spaced apart relationship with each other and in opposed relationship to said first and second light sources, respectively, said closing direction sensor comprises third and fourth light sources, respectively, mounted on the horizontal member on one side of said door, in an up-and-down spaced apart relationship with each other and in opposed relationship to the other of the actuating portions formed on said dog, said third and fourth light sources being spaced apart from said first and second photo-electric switches by a predetermined distance in the opening and closing directions of said door, and third and fourth photo-transistors, respectively, mounted on the another horizontal member on the opposite side of said door, in an up-and-down spaced apart relationship with each other and in opposed relationship to said third and fourth light sources, respectively.

6. The apparatus as claimed in claim 5, wherein said dog is comprised of an elongated plate-shaped body projecting from the upper end of said door, and one of said actuating portions adapted to turn ON and OFF said opening direction and closing directions sensors comprises two notches formed on the upper extreme ends of both sides of said elongated plate-shaped body and adapted to turn ON said first and third photo-electric switches, respectively, while the other of said actuating portions comprises a plurality of holes or apertures formed at an equal space interval in the lower part of said elongated plate-shaped body in the longitudinal direction thereof, and adapted to turn ON said second and fourth photo-electric switches, respectively, the outer side surface of each of said apertures at both extreme ends being located so as to align with the vertical side surface of each of said two notches.

7. The apparatus as claimed in claim 5, wherein said first and second light sources and said third and fourth light sources are being in vertically spaced apart positional relationship.

8. The apparataus as claimed in claim 5, wherein said second and fourth photo-electric switches are displaced from said first and third photo-electric switches by a horizontal distance less than the width of said notch while keeping said up-and-down spaced apart relationship relative to said first and third photo-electric switches, thereby enabling whether the door is moving in opening direction or in closing direction to be discriminated.

9. The apparatus as claimed in claim 5, wherein said dog is comprised of an elongated plate-shaped body of a light transparent material projecting from the upper end of said door, and the actuating portions adapted to turn OFF said opening and closing direction sensors are opaque tapes applied to proper places on the body of said dog.

* * * * *